June 12, 1962
E. M. L. ALLARD ET AL
3,038,465
MICROMANOMETER PARTICULARLY ADAPTED FOR
USE WITH A CARDIAC CATHETER
Filed Aug. 6, 1959
2 Sheets—Sheet 1
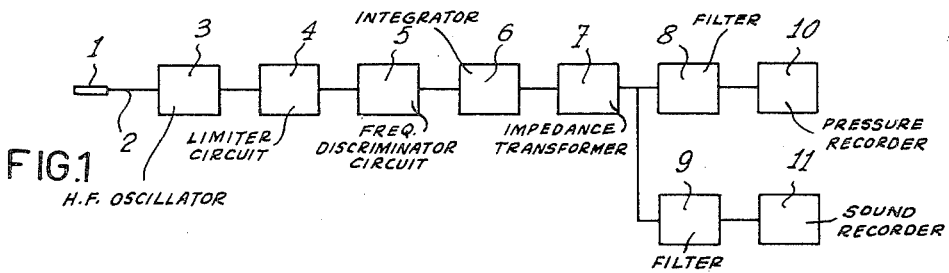
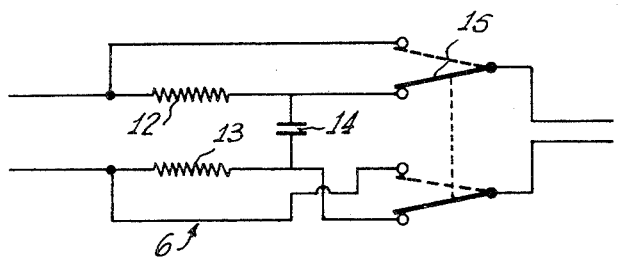
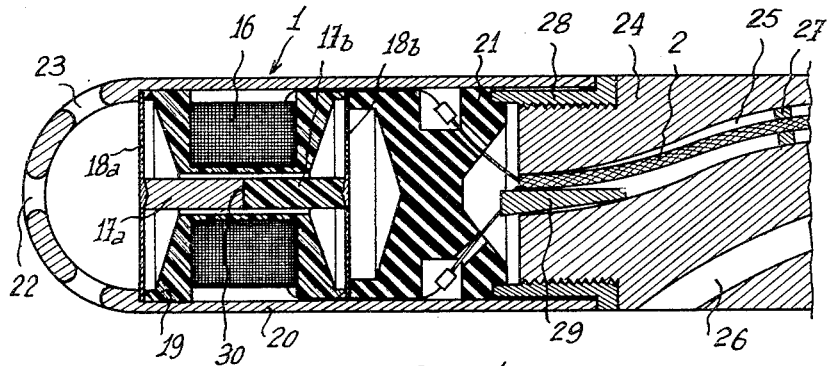
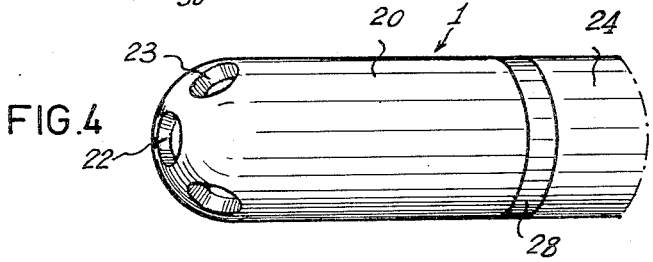

June 12, 1962

E. M. L. ALLARD ET AL 3,038,465

MICROMANOMETER PARTICULARLY ADAPTED FOR USE WITH A CARDIAC CATHETER

Filed Aug. 6, 1959

3,038,465
MICROMANOMETER PARTICULARLY ADAPTED
FOR USE WITH A CARDIAC CATHETER
Emmanuel Marie Lucien Allard, 5 Rue Leon Bonnat,
and Paul Germain Louis Laurens, 56 Rue Pergolese,
both of Paris, France
Filed Aug. 6, 1959, Ser. No. 832,114
Claims priority, application France Aug. 7, 1958
10 Claims. (Cl. 128—2.05)

As disclosed in French Patent No. 1,042,204, issued to E. M. L. Allard, one of the applicants herein, there exists at the present time a micromanometer composed of a winding connected to a condenser in such a manner as to form therewith an oscillating circuit, and in which there is disposed a core in two parts, one of a material of high magnetic permeability and the other of a material of low magnetic permeability, the said core being interposed between two elastic diaphragms, one of which is acted on by the pressure to be measured while the other is subjected to a reference pressure.

When the pressure to be measured varies, the elastic diaphragm is deformed and displaces the core, which results in the variation of the self-inductance of the winding and consequently of the frequency of the oscillating circuit in which the said winding is incorporated. This variation of frequency is converted in a known manner by a discriminator into a variation of voltage, which is applied to an indicating or recording apparatus.

This manometer is utilisable in particular in cardiac catheterisation, for the purpose of measuring the blood pressure inside the heart. In certain applications, particularly in that just mentioned, the manometer is constructed in the form of a probe head which contains the winding and is connected to the electronic apparatus by a catheter containing the conductors connecting the winding.

The present invention relates to a micromanometer of the above described type, which is so improved as to be reliable in operation.

According to the invention, the coefficient of expansion of the core part of low magnetic permeability is at least four times as great as that of the core part of high magnetic permeability, and the probe head is covered with a cap the end of which is in the form of a perforated dome.

Since a variation of temperature modifies in the same direction the inductance of the winding; there is consequently a risk of falsifying the measurement. The invention overcomes this disadvantage by providing a thermal expansion of the insulating element which is greater than that of the other element, so that the joint between the two elements is displaced, when the temperature rises, in the direction tending to increase the projection of the element of high permeability from the winding, so that the inductance of the winding is reduced.

The two parts of the core may for example be of Mumetal and Plexiglas, of which the coefficients of ex-expansion are respectively $12 \times 10^{-6}$ °C. and $100 \times 10^{-6}$ °C.

In an actual apparatus of the previously existing type, the winding alone supplies, for a temperature rise of 20°, between 20° and 40°, a drift equivalent to 27/4000 mm. mercury.

With a core composed of a Plexiglas part 2.1 mm. in length, and a Mumetal part 1.85 mm. in length, that is, embodying the present invention, the drift was zero in the range of temperature variations from 20 to 40° C.

In order still further to attenuate the effect of a variation of temperature, the diaphragm situated on the side of the element of high permeability may be given a larger surface than the other diaphragm. When there is a rise in temperature, the air imprisoned between the two diaphragms expands, thereby increasing the internal pressure on the two diaphragms. The force applied to the diaphragm situated on the side of the element of high magnetic permeability is greater, so that this element is displaced in the direction corresponding to its extension from the winding and the inductance of the latter is reduced.

It is also possible to provide the catheter with a tube of a larger diameter than is necessary for the passage of the connections, the said tube being closed at a certain distance from the probe head. When there is a rise in temperature, the air imprisoned between the closure of the tube and the adjacent diaphragm expands and applies to the said diaphragm a counter-pressure which reduces the effect on the other diaphragm of the fluid of which the pressure is to be measured. The value of this counter-pressure may be modified by placing the closure at a greater or smaller distance from the probe head.

In addition, the cap of the probe head embodying this invention, avoids direct contact between the diaphragm and the walls of the heart. Moreover, it prevents a certain quantity of blood from being trapped between the diaphragm and the wall of the heart, which would produce a momentary excess pressure with a considerable parasitic noise. An excess pressure of this type would risk locking the measuring or recording apparatus at the end of the stroke, and would effect a not inconsiderable hysteresis of the diaphragms.

The cap may have a central hole at its end and a series of lateral holes, the edges of the various holes being rounded. The blood then enters the cap through the central hole and leaves by the lateral holes and coagulation of the blood within the cap need not be feared.

The probe head may be used at the same time as an intra-cardiac microphone, permitting listening to and location of an intra-cardiac noise. The term "intra-cardiac noises" designates the variations of pressure the frequencies of which are within the sound spectrum, that is to say 20 to 20,000 cycles per second. Ventricular sounds, for example, expressed as a variation of pressure, have an amplitude about 100 times lower than the variations of pressure inside the ventricle; these variations of pressure therefore greatly hinder the recording of extra-cardiac sounds.

In order to overcome this difficulty, the probe head may be connected to a device for recording intra-cardiac sounds through the medium of a high pass filter the cut-off frequency of which is about 30 c.p.s. As the sounds have frequencies ranging from 30 to 5,000 c.p.s., whereas the variations of pressure in a cardiac cavity have a frequency which is generally below 100 c.p.s., it is thus possible to separate the variations of pressure from the sounds.

The sounds sometimes reduce the clearness of the pressure curves, and thus it is also possible to interpose between the pressure gauge and the indicating or recording apparatus for the variations of pressure a low pass filter the cut-off frequency of which is about 100 c.p.s.

The probe head may be fixed on the catheter through the medium of a ring screwed on the latter, a wedge being forced into the passage to press the wall of the catheter against the ring. Thus there is no risk of the head being separated from the catheter when the latter has been placed in position, for example inside the heart.

The ring may be of plastic material. It may also be metallic and be used as an intra-cavity electrode.

The catheter may comprise two tubes, one of which contains the connecting conductors, while the other leads to the outside through a lateral hole near the probe head. When the micromanometer is used for cardiac catheterisation, it is then possible either to take samples of blood, or to check the intra-cardiac pressure with the aid of an outside manometer, thus permitting the operation of the micromanometer to be checked.

In addition to its end opening, the cap may have a lateral opening provided at the rear of the core and its diaphragms.

When this is so, the probe head being placed in a blood vessel, for example counter-current, the dynamic pressure of the blood acts on the front diaphragm, while the static pressure acts on the rear diaphragm through the medium of the lateral aperture in the cap. The position assumed by the core depends on the difference between these two pressures, that is to say on the speed of the fluid. The electronic apparatus thus supplies a voltage or a current which is dependent on the speed and thus enables the latter to be determined accurately.

There are described below, by way of non-limitative example, two forms of construction of the micromanometer of the invention, more particularly adapted to cardiac catheterisation, with reference to the accompanying drawings, in which:

FIGURE 1 illustrates diagrammatically the electrical apparatus used in connection with a manometer embodying this invention, FIGURE 2 is a detail wiring diagram of the integrator.

FIGURE 3 is an axial sectional view of the probe head,

FIGURE 4 is a perspective view of the protective cap of the probe head of FIGURE 3.

Figure 5:
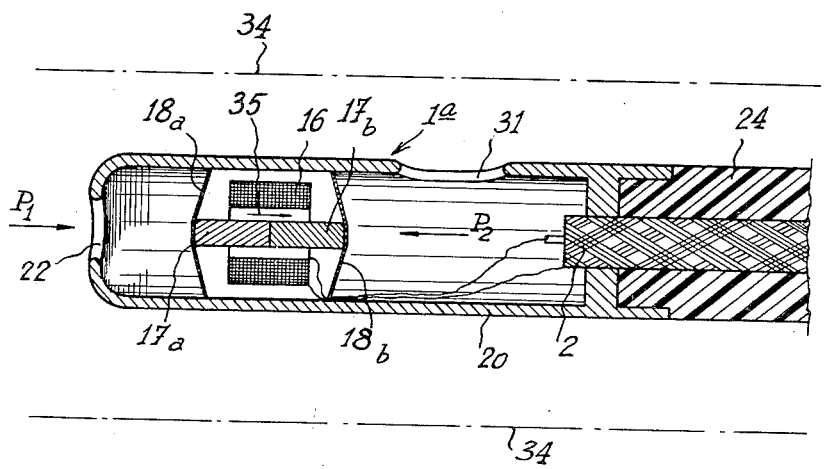
FIGURE 5 is a view in axial section of a second form of construction of the probe head.

As illustrated in FIGURES 1 to 4, the manometer embodying this invention comprises a sensitive element or probe head 1, which is connected by an arrangement of conductors 2 to an electrical apparatus.

As will be seen below, the head produces an electrical inductance the variation of which, under the effect of a modification of the pressure, determines the frequency of oscillation of a high frequency oscillator 3, the latter being for example of the Franklin type having high frequency stability in order to reduce the background noise. The variable frequency signal amplitude passing out of this oscillator is brought to a constant value in a limiter circuit 4, which feeds a frequency discriminator circuit 5. The resulting signal is transmitted by an optional integrator 6 and an impedance transformer 7, on the one hand to a low pass filter 8 the cut-off frequency of which is about 100 c.p.s., and on the other hand to a high pass filter 9 the cut-off frequency of which is about 30 c.p.s.

The output of the low pass filter is connected to an apparatus 10 indicating or recording the intra-cardiac pressure, while the output of the high pass filter 9 is connected to the apparatus 11 recording the intra-cardiac sound.

As can be seen from FIGURE 2, the integrator circuit 6 is symmetrical and comprises two resistances 12 and 13 in series and a condenser 14 in parallel. This integrator circuit may be placed out of action by a reverser switch 15, in which case the impedance transformer 7 is connected directly to the discriminator 5. When the integrator circuit is out of action, the apparatus 10 indicates the instantaneous value of the pressure, while when the circuit is inserted in the apparatus it indicates the mean value of this pressure during, for example, the preceding 10 to 20 seconds.

The probe head 1 illustrated in FIGURE 3 comprises a winding 16 in which is disposed a two-part core 17a and 17b. The element 17a of the core, which is directed towards the end of the probe head, is of a metal of high magnetic permeability, while the other element 17b is of an insulating material. It is obviously possible to adopt the converse arrangement. The core 17a—17b is interposed between two elastic diaphragms 18a—18b. The diaphragm 18a is gripped between the support 19 of the winding 16 and an inside shoulder of a cap 20, in which are housed the various elements of the probe head. The diaphragm 18b in turn is gripped between the support 19 and an insulating spacer 21. The fastening of the diaphragms may be reinforced by adhesively securing their edges to the parts between which they are gripped.

The cap 20 is polished externally and may for example be made of the material known in commerce under the name of "Plexiglas." Its end is provided with a central hole 22 and with a series of lateral holes 23, the edges of the holes being rounded.

The probe head 1 is connected to the electronic apparatus by a catheter 24 having two longitudinal passages 25 and 26 therein. The cable 2 connecting the winding 16 to the oscillator 3 is a coaxial cable and extends through the passage 25, which may be blocked at a certain distance from the probe head by a stopper 27. The second passage 26 opens laterally near the probe head.

On the end of the catheter 24, which is threaded, is screwed a ring 28, which may be of insulating material or of metal. This ring serves as a stop for the insulating spacer 21 and the cap 20 is fixed on it. A wedge 29 is driven by force into the end of the passage 25 and thus compresses the peripheral portion of the catheter against the ring 28 for rendering the two parts solid with one another.

In order to carry out cardiac catheterisation, the probe head is introduced into the heart, for example through the medium of a vein or an artery of the arm. The blood penetrates into the dome shaped end of cap 20 through the central hole 22 and passes out thereof through the holes 23, applying a pressure to the outer face of the diaphragm 18a. As the outer face of the diaphragm 18b is subjected to a constant pressure, for example atmospheric pressure, under which air is trapped in the space between diaphragm 18b and the insulating spacer 21 a variation of the intra-cardiac pressure results in displacement of the diaphragms as a unit and consequently of the core 17a—17b. As a result of this displacement, the inductance of the winding 16 varies, so that the oscillation frequency of the oscillator 3 also varies. At the output of the discriminator 5 there is thus received a voltage the amplitude of which is dependent on the variation of pressure. In addition, the same arrangement forms an intra-cardiac microphone, so that at the output of the impedance transformer 7 there are obtained currents representing simultaneously the variations of pressure and the intra-cardiac sounds. The sounds, however, have frequencies ranging from 20 to 5000 c.p.s., and the currents representing the sounds pass through the high pass filter 9 to be recorded by the apparatus 11. The currents representing the variations of pressure pass through the low pass filter 8 and to the apparatus 10.

When there is a rise in temperature, for example, the element 17b of the core expands more than the element 17a, so that the joint 30 between the two elements is displaced towards the end of the probe head and the fraction of the element 17a which was situated in the winding 16 is reduced. In addition, the air imprisoned between the diaphragm 18b and the stopper 27 expands, so that the pressure applied to the outer face of the diaphragm 18b increases, this increase in pressure tending to displace the core towards the end of the probe head, and thus also to reduce the fraction of the elements 17a situated in the winding. The displacement of the element 17a entails a reduction of the inductance of the winding 16, which compensates for the increase in inductance due to a rise in temperature. It is thus possible to obtain readings which are practically independent of the temperature.

The passage 26 may be used either for taking a sample of blood or for verifying, with the aid of an outside manometer, the intra-cardiac pressure and thus the presence or absence of drift in the micromanometer.

Finally, when the ring 28 is metallic, it may be used as an intra-cavity electrode for electrocardiography.

Figure 6:
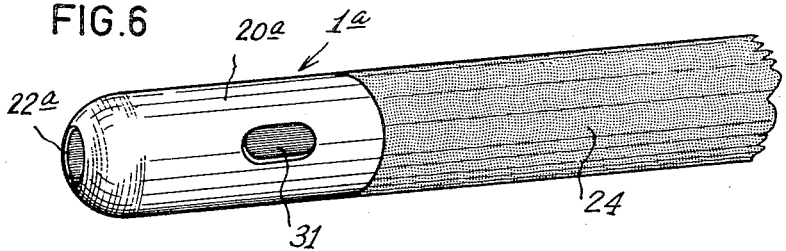
FIGURE 6 is a perspective view thereof.
Figure 7:
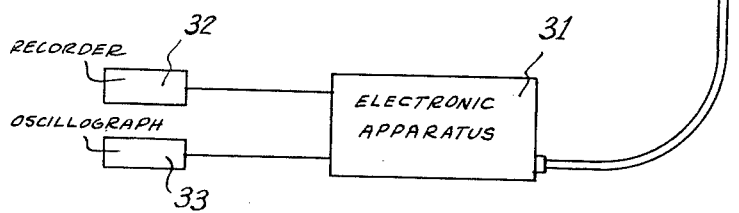
FIGURE 7 illustrates diagrammatically the complete device.

In the embodiment illustrated in FIGURES 5 to 7, the cap 20a is provided not only with an opening 22a at its front end, but also with a second opening 31 in its side wall to the rear of the diaphragm 18b.

The electronic apparatus, which in FIGURE 7 is designated in a general way by the reference 31, comprises a condenser forming, with the winding 16, an oscillating circuit. This circuit determines the frequency of an oscillator. A discriminator circuit transforms into a variation of voltage the variation of the tuned frequency of the oscillating circuit. The output of the discriminator circuit is connected for preference by a coupling device (amplifier or cathodic output), on the one hand to a recording apparatus 32 and on the other hand to an oscillograph 33.

In order to measure the speed of circulation of the blood in a blood-vessel 34, the head 1 and the catheter 24 are introduced into the vessel 34. The dynamic pressure $P_1$ of the blood is applied to the diaphragm 18a, while only the static pressure $P_2$ is applied to the diaphragm 18b.

Under the effect of this difference of pressure, the core 17a—17b is displaced in the direction of the arrow in FIG. 5, thus varying the inductance of the winding 16. The tuning frequency of the oscillating circuit formed by the said winding and the condenser enclosed in the electronic apparatus 31 varies, and at the output of the discriminator there is received a voltage dependent on the inductance, and hence on the speed of the blood, and this speed can be read on the oscillograph 33 and recorded by the apparatus 32.

The lateral movements of the head 1 do not affect the reading, which represents the movement of the blood at the moment considered, without any retardation. In addition, the response frequency is very high, because it extends from 0 to about 5,000 c.p.s. for a probe head of a diameter of 2.4 mm.

Although illustrative embodiments of the invention have been described in detail herein with reference to the accompanying drawings, it is to be understood that the invention is not limited to those precise embodiments thereof, and that various changes and modifications may be effected therein by one skilled in the art without departing from the scope or spirit of the invention, except as defined in the appended claims.

What we claim is:

1. A micromanometer intended particularly for cardiac catheterisation and comprising a probe head including a cap having an end in the form of a perforated dome, a winding in said cap, a core disposed in said winding and being composed of two parts of different magnetic permeabilities, said core being interposed between two elastic diaphragms, one of said diaphragms facing toward said perforated dome and being adapted to be acted on by the pressure to be measured, means in said cap defining a chamber facing the other of said diaphragms and being adapted to contain a fluid under a reference pressure, an electronic apparatus including a condenser adapted to be connected with said winding to form an oscillating circuit with the latter, and a catheter extending from said probe head to said electronic apparatus and containing conductors for connecting the winding with said condenser, the coefficient of expansion of the part of the core of low magnetic permeability being at least four times as great as the coefficient of expansion of the part of the core of high magnetic permeability so that a change in the inductance of said winding by reason of a change in temperature is compensated for by a shifting of the part of said core of relatively high magnetic permeability with respect to said winding.

2. A micromanometer according to claim 1, in which the electronic apparatus further comprises a device for recording intra-cardiac sounds, a high pass filter having a cut-off frequency of about 30 c.p.s. and connecting said device to said probe head, a device for indicating variations of pressure, and a low pass filter having a cut-off frequency of about 100 c.p.s., said low pass filter connecting said probe head with said device for indicating variations of pressure.

3. A micromanometer according to claim 1, in which the cap has, in addition to said perforated dome, a lateral aperture situated behind the core and said diaphragms, thus permitting measurement of the speed of the fluid in which the manometer is placed.

4. A micromanometer according to claim 1, in which the catheter has a passage of a larger diameter than that of said conductors, and further comprising means in said passage at a certain distance from the probe head and being operative to block said passage.

5. A micromanometer according to claim 1, in which said perforated dome of the cap has a central hole at its end and a series of lateral holes.

6. A micromanometer according to claim 1, further comprising means for fixing the probe head on said catheter including a ring screwed on said catheter and a wedge forced into the catheter to press the wall of the latter against the ring.

7. A micromanometer according to claim 1, in which said catheter has two longitudinal passages, one of said passages opening into the probe head and containing said connecting conductors, and the other of said passages opening externally of said probe head through a lateral hole in said catheter near the probe head.

8. A micromanometer according to claim 6, in which said ring is metallic and forms an intra-cavity electrode.

9. In a micromanometer intended for cardiac catheterisation, a probe head comprising a cap having a perforated dome at one end to admit blood to the interior of said cap, a winding in said cap, a core extending movably through said winding and having first and second axially arranged parts extending substantially from the center of said core to the opposite ends of the latter, with said first core part extending toward said one end of the cap and being of a material of high magnetic permeability while said second core part is of a material of low magnetic permeability so that the inductance of said winding depends upon the length of said first core part of high magnetic permeability disposed within the winding, first and second diaphragms connected to said opposite ends of the core, said first diaphragm extending across said apertured dome of the cap and being subjected to the pressure of blood admitted to the interior of the cap to tend to move the core in the direction increasing the length of said first core part within said winding and thereby increasing the inductance of the latter, and means in said cap defining a chamber which is adapted to contain a fluid under a reference pressure, said second diaphragm extending across said chamber and being subjected to said reference pressure to resist movement of said core by the pressure of blood on said first diaphragm, and said second core part having a coefficient of expansion at least four times as great as the coefficient of expansion of said first core part so that an increase in temperature tending to increase the inductance of said winding also causes a relative shift of said core in the direction for decreasing the length of said first core part within the winding, thereby to compensate for the temperature produced increase in inductance and to cause the latter to be an accurate function of the blood pressure.

10. In a micromanometer intended for cardiac catheterisation, a probe head as in claim 9; further comprising means sealing said chamber to trap air therein at atmospheric pressure, so that an increase in temperature also increases said reference pressure in said chamber and further tends to shift the core in the direction for compensating the temperature induced increase in the inductance of said winding.

References Cited in the file of this patent

UNITED STATES PATENTS

| | | |
|---|---|---|
| 2,510,073 | Clark | June 6, 1950 |
| 2,634,721 | Greenwood | Apr. 14, 1953 |
| 2,702,883 | Petroff et al. | Feb. 22, 1955 |

FOREIGN PATENTS

| | | |
|---|---|---|
| 1,042,204 | France | Oct. 29, 1953 |